US012776320B2

(12) United States Patent
Huang et al.

(10) Patent No.: US 12,776,320 B2
(45) Date of Patent: Oct. 27, 2026

(54) # AUTOMATED EXTRACTION OF BRAND VOICE ATTRIBUTES FOR GENERATION OF CONTENT INBRAND VOICE THROUGH MACHINE LEARNING

(71) Applicant: INTUIT INC., Mountain View, CA (US)

(72) Inventors: Timothy Huang, Sunnyvale, CA (US); Julia Floreak, Atlanta, GA (US); Ashton Phillips Griffin, Steamboat Springs, CO (US); Skanda Vivek, Duluth, GA (US); Amit Sajjankumar Agrawal, Milpitas, CA (US); Tracie Kreiss, New York, NY (US); Andres Castro, Atlanta, GA (US); Justin Bradford Lovell, Atlanta, GA (US)

(73) Assignee: INTUIT INC., Mountain View, CA (US)

( * ) Notice: Subject to any disclaimer, the term of this patent is extended or adjusted under 35 U.S.C. 154(b) by 102 days.

(21) Appl. No.: 19/063,143

(22) Filed: Feb. 25, 2025

(65) Prior Publication Data

US 2025/0342835 A1 Nov. 6, 2025

Related U.S. Application Data

(60) Provisional application No. 63/643,352, filed on May 6, 2024.

(51) Int. Cl.
*G10L 15/22* (2006.01)
*G10L 25/30* (2013.01)

(52) U.S. Cl.
CPC .............. *G10L 15/22* (2013.01); *G10L 25/30* (2013.01)

(58) Field of Classification Search
CPC ......... G10L 15/22; G10L 25/30; G06N 20/00; G06F 40/30; G06Q 10/10; G06Q 30/0276; G06Q 30/0277
See application file for complete search history.

(56) References Cited

U.S. PATENT DOCUMENTS

| | | | | |
|---|---|---|---|---|
| 11,748,577 B1 * | 9/2023 | Aberle | .................. | G06F 40/169 704/9 |
| 2024/0062016 A1 * | 2/2024 | Tong | ....................... | G06F 40/20 |

FOREIGN PATENT DOCUMENTS

| | | | | |
|---|---|---|---|---|
| AU | 2023204364 A1 * | 3/2024 | ............. | G06F 40/30 |
| CA | 3207369 A1 * | 2/2024 | ............... | G06N 3/09 |

(Continued)

*Primary Examiner* — Mohammad K Islam
(74) *Attorney, Agent, or Firm* — Patterson + Sheridan, LLP

(57) ABSTRACT

Aspects of the present disclosure provide techniques for automated extraction of brand voice attributes for content generation in a brand voice through machine learning. Embodiments include determining a set of user-generated content items associated with a user from which to extract brand voice attributes and providing the set of user-generated content items to a language processing machine learning model along with a prompt that instructs the language processing machine learning model to extract the brand voice attributes from the set of user-generated content items. Embodiments include receiving the brand voice attributes from the language processing machine learning model in response to the prompt. Embodiments include automatically generating content based on the brand voice attributes. Embodiments include outputting the content for display via a user interface.

20 Claims, 6 Drawing Sheets

(56) References Cited

FOREIGN PATENT DOCUMENTS

| | | | | | |
|---|---|---|---|---|---|
| CN | 121864843 | A | * | 4/2026 | ............. G10L 15/30 |
| WO | WO-2025122166 | A1 | * | 6/2025 | ............. G06F 3/167 |

* cited by examiner

AUTOMATED EXTRACTION OF BRAND VOICE ATTRIBUTES FOR GENERATION OF CONTENT INBRAND VOICE THROUGH MACHINE LEARNING

RELATED APPLICATIONS

This application claims the benefit of U.S. Provisional Application No. 63/643,352, entitled "AUTOMATED EXTRACTION OF BRAND VOICE ATTRIBUTES FOR GENERATION OF CONTENT IN BRAND VOICE THROUGH MACHINE LEARNING," by the same inventors, filed 6 May 2024, the contents of which are incorporated herein in their entirety.

INTRODUCTION

Aspects of the present disclosure relate to techniques for automatically extracting dynamic brand voice attributes for generating content in a brand voice though machine learning, where a brand voice is defined through the dynamic brand voice attributes.

BACKGROUND

Every year millions of people, businesses, and organizations around the world utilize software applications to assist with countless aspects of life. Some software applications provide automated content generation functionality. For example, a software application may utilize a machine learning model that has been trained to process natural language prompts and to generate text content in response, such as prompting such a model to generate a content item for a user. Large language models (LLMs), for instance, may be used to perform content generation.

Automatically generated content may provide many benefits, such as savings in costs, time, and resources, but in some cases a user may not be satisfied with automatically generated content for a variety of reasons. Such content may, for example, vary in quality and may not always be effective for particular purposes for which the user intends to use the content (e.g., advertising, promotion, informing, entertainment, customer assistance, and/or the like). Automated generation of content that a particular user will be satisfied with for a particular purpose is a technical challenge, particularly given the nuances of how content is formulated and received in different contexts and the difficulties of addressing such nuances in automated processes.

Accordingly, there is a need in the art for improved techniques of automated content generation in software applications.

BRIEF SUMMARY

Certain embodiments provide a method for automated content generation in a brand voice through machine learning. The method generally includes: determining a set of user-generated content items associated with a user from which to extract brand voice attributes; providing the set of user-generated content items to a language processing machine learning model along with a prompt that instructs the language processing machine learning model to extract the brand voice attributes from the set of user-generated content items; receiving the brand voice attributes from the language processing machine learning model in response to the prompt; and automatically generating content based on the brand voice attributes; and outputting the content for display via a user interface.

Other embodiments comprise systems configured to perform the method set forth above as well as non-transitory computer-readable storage mediums comprising instructions for performing the method set forth above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
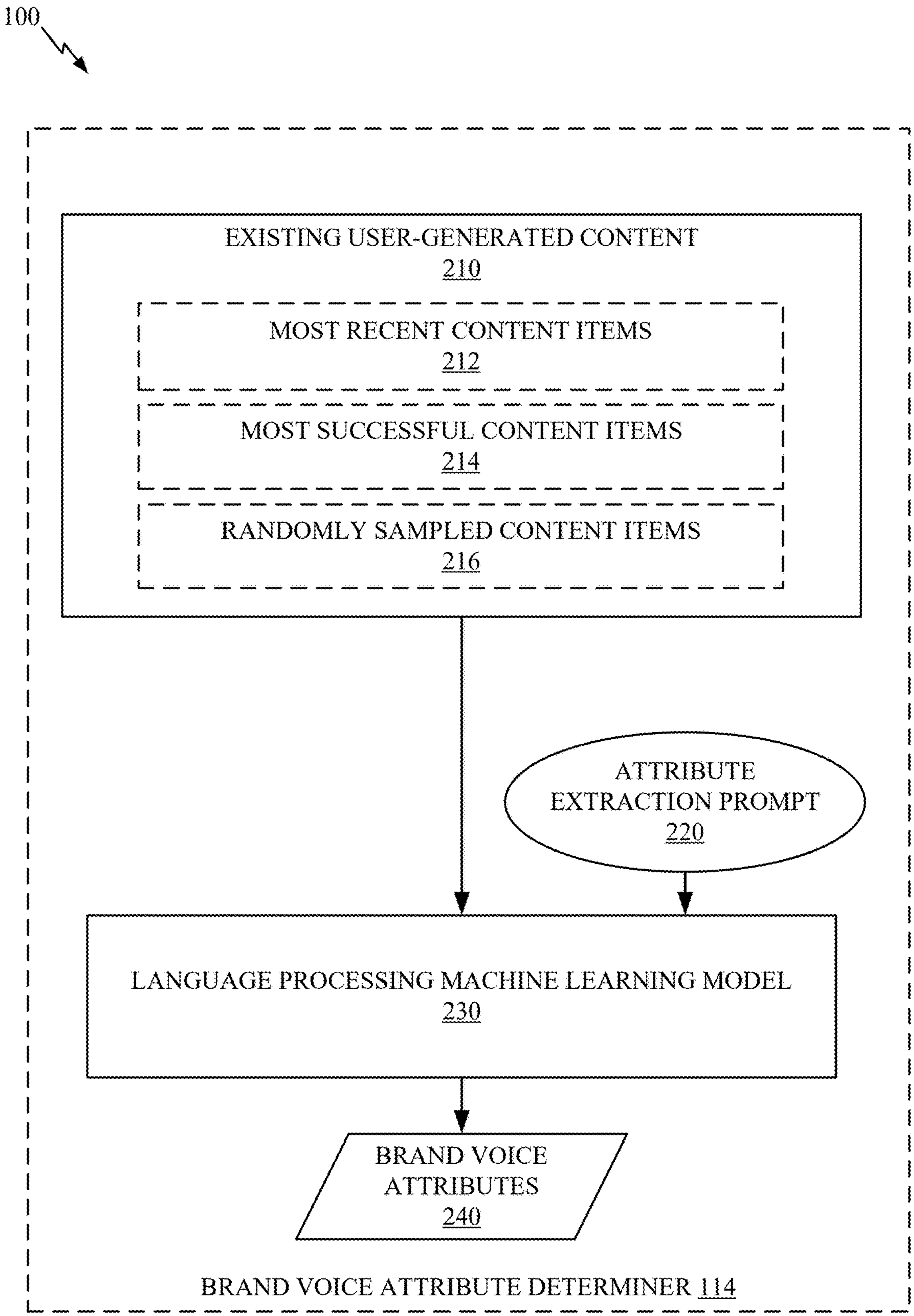
FIG. 1 is a diagram illustrating an example of automated extraction of brand voice attributes for automated content generation in a brand voice through machine learning, according to certain embodiments.

Aspects of the present disclosure provide apparatuses, methods, processing systems, and computer-readable mediums for automated extraction of brand voice attributes for automated content generation in a brand voice through machine learning.

Software applications may use machine learning models to automatically generate content for users. In an example, a software application may utilize a generative language processing machine learning model such as a large language model (LLM) to generate content upon request from a user, such as providing a natural language prompt to such a model that instructs the model to generate the requested content. However, existing techniques for automated content generation may not result in content that is acceptable to a user. For example, content generated by a machine learning model may not be formulated in a manner that a user considers appropriate for a particular purpose, such as advertising or promoting a particular business, product, service, or the like.

In particular, content generated through existing automated techniques may not conform to a "brand voice" preferred by a particular user because, for example, existing generative machine learning models are trained on a large corpus of text content that includes a wide variety of differing "voices," few or none of which may correspond to the user's particular brand. A brand voice generally refers to a variety of attributes that define a manner in which a particular user or entity (e.g., business) prefers to formulate natural language communications. For example, one brand voice may be concise, matter of fact, and optimistic, while another brand voice may be detailed, expressive, and humorous. Determining brand voice attributes of a user by a software application is a technical challenge, as users may not be able to accurately describe or quantify their brand voice (e.g., through input to the software application) in a way that translates well to an automated content generation process, and the software application may not otherwise have a way to determine such brand voice attributes of a user with existing techniques.

Embodiments described herein address the technical challenge of determining brand voice attributes of a user through a particular machine learning based automated brand voice attribute extraction process. As described in more detail below with respect to FIG. 1, a language processing machine learning model may be used to automatically extract brand voice attributes from existing user-generated content items, such as the n most recently generated content items associated with the user, the n most successful content items associated with the user (e.g., success may be based on an extent to which recipients engaged with and/or responded positively to content items), n randomly sampled content items associated with the user, and/or the like (where n may be a configurable value). For example, a prompt may be generated that instructs a language processing machine learning model to extract particular types of brand voice attributes from such existing user-generated content items, and the existing user-generated content items may be included as few-shot learning examples in the prompt Advantageously, embodiments of the present disclosure involve automatically extracting particular brand voice attributes that are valuable for automatically generating content in a brand voice. As described in more detail below with respect to FIG. 3, such brand voice attributes may include a narrative brand voice description (e.g., a brief natural language description of the brand voice, such as in 1-3 sentences), brand voice trait classifications (e.g., personality traits, emotions, matter of fact or expressive, and/or the like), and writing style attributes (e.g., sentence structure, sentence length, punctuation, figures of speech, use of bullet points or lists, point of view, key words, inquisitive or declarative style, and/or the like). Once automatically extracted by the language processing machine learning model, these brand voice attributes may be used in an automated content generation process. For example, as described in more detail below with respect to FIG. 3, a prompt including the brand voice attributes may be generated, such as instructing the model to generate requested content according to the brand voice attributes. The brand voice attributes may, for example, be included as few-shot learning examples in the prompt. The prompt may then be provided to a generative language processing machine learning model, which may generate the requested content in the brand voice associated with the user based on the brand voice attributes.

In some embodiments, users may be enabled to modify and/or otherwise customize brand voice attributes, such as after viewing content that was automatically generated based on the brand voice attributes. For example, as described in more detail below with respect to FIG. 4, the brand voice attributes that were automatically extracted for a user may be displayed via a user interface, and the user may provide feedback (e.g., adding removing, and/or otherwise modifying one or more brand voice attributes) with respect to the displayed brand voice attributes. The user feedback may be used to generate updated content. For example, the modified brand voice attributes may be used to generate an updated prompt, and the updated prompt may be provided to the generative language processing machine learning model to generate different content.

In some cases, recipient attributes may also be used in the automated content generation process. For example, content that is automatically generated may include a message or other content intended to be transmitted to particular recipients or types of recipients, and attributes of those recipients or types of recipients may be further used as brand voice attributes (or, in some embodiments, tone attributes that modify a brand voice). Content that is automatically generated in a brand voice as described herein may be transmitted to one or more recipients, such as via email, via text message, through a web site, and/or the like.

Figure 2:
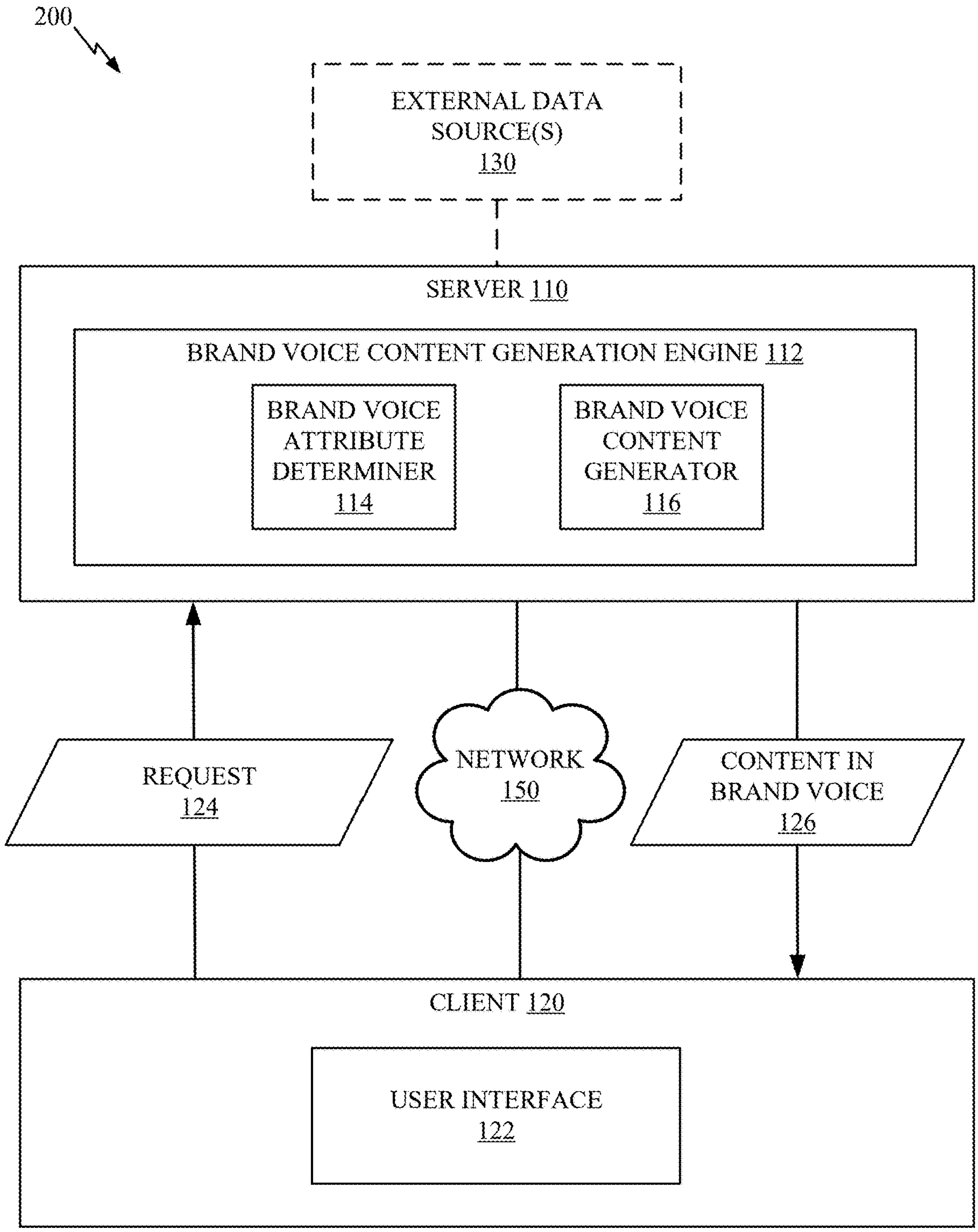
FIG. 2 is a diagram illustrating example computing components related to automated extraction of brand voice attributes for automated content generation in a brand voice through machine learning, according to certain embodiments.

Embodiments of the present disclosure solve the technical challenge of automatically generating content that is better tailored to a particular user's preferences and/or purpose through a process that involves automatically extracting particular types of brand voice attributes for a user (e.g., from existing user-generated content items through machine learning) and then using those automatically extracted brand voice attributes in a particular manner for automated content generation, as described in more detail below with respect to FIG. 2.

Techniques described herein improve the technical field of automated content generation by software applications in a number of ways. For example, aspects of the present disclosure overcome the technical challenge of determining effective brand voice attributes for a user of a software application through an automated brand voice extraction process in which certain (e.g., most recent, most successful, randomly sampled, and/or the like) existing user-generated content items associated with the user are processed using a language processing machine learning model that is provided with a prompt including instructions to output the extracted brand voice attributes (e.g., according to a specified structured format, such as including a particular list of brand voice attributes). Certain embodiments involve providing user interface controls that allow a user to specify, review, and/or modify brand voice attributes used in automated content generation, thereby providing improved customizability and understandability to the automated content generation process. Techniques described herein additionally include a feedback loop by which automated content generation in a brand voice of a user is iteratively improved based on user feedback with respect to the automatically generated content and/or the automatically extracted brand voice attributes used to automatically generate such content. For example, when modifications to brand voice attributes are received from a user (e.g., after the brand voice attributes were used to automatically generate a content item, with which the user may not have been satisfied), a different content item may be automatically generated using the modified brand voice attributes.

Furthermore, by enabling automatic determination of particular types of brand voice attributes for a user, such as a narrative brand voice description, brand voice trait classifications, and writing style attributes, techniques described herein allow such attributes to be used in an automated content generation process such that the automatically generated content corresponds to the brand voice of the particular user, when such a brand voice would otherwise be difficult or impossible to otherwise quantify and/or determine in a manner that is usable for an automated content generation process. Thus, embodiments of the present disclosure overcome the technical challenge of automatically generating content that is tailored to a particular user's preferences and/or purpose through the automated determination of particular types of brand voice attributes for the user through machine learning and the use of these attributes for automatically generating content, such as by generating a prompt including these attributes as few-shot learning examples to provide to a generative machine learning model.

Additional technical improvements may be achieved in some embodiments by utilizing attributes of one or more intended recipients or recipient types of a content item in the automated generation process for the content item (e.g., thereby automatically producing content that is better tailored to its recipients), by accessing other data sources such as websites to automatically determine information about a user's brand voice (e.g., thereby allowing a user's brand voice to be automatically determined even in cases where little relevant information is otherwise available to the software application), and/or the like.

Techniques described herein enable the automated generation of content in a brand voice (e.g., that is accurately captured in the form of particular brand voice attributes that are automatically determined) such that the generated content is better tailored to a particular user and/or purpose than content generated using existing techniques that do not involve such automated brand voice determination and generation processes. By avoiding the automated generation of content that is unlikely to be accepted by a user and/or the is likely to be significantly modified by a user, techniques described herein avoid the unnecessary computing resource utilization that would otherwise occur in connection with generating such low-quality content and/or in connection with extensive modification of such content (e.g., avoiding the use of display, memory, processing, and/or communications resources that would otherwise be utilized when a user extensively edited a low-quality automatically-generated content item).

Example Automated Determination of Brand Voice Attributes

FIG. 1 is a diagram 100 illustrating example automated extraction of brand voice attributes for automated content generation in a brand voice through machine learning, according to certain embodiments. Diagram 100 includes a brand voice attribute determiner 114, which is shown within a computing environment in FIG. 2.

Brand voice attribute determiner 114 may retrieve existing user-generated content 210 that is associated with the user for which content is to be automatically generated. For example, existing user-generated content 210 may include content items that the user previously provided, such as by generating and/or uploading the content items via a user interface (e.g., user interface 122 of FIG. 2, described below). In some cases, the content items may not have been generated by the same user, but may be associated with the user, such as being generated or provided by a different user that is associated with the same organization or business as the user. Existing user-generated content 210 may, for example, be retrieved from a data store associated with the software application through which the user content items were generated.

A subset of existing user-generated content 210 may be selected for use in determining brand voice attributes. In one embodiment, one or more most recent content items 212 are selected, such as the n most recently generated or provided content items associated with the user. In another embodiments, one or more most successful content items 214 are selected, such as the n content items associated with the user that received the largest amount of engagement (e.g., clicks, interactions, responses, and/or the like) and/or positive feedback from recipients. In yet another embodiment, one or more randomly sampled content items 216 are selected, such as n content items associated with the user that are selected at random from all content items associated with the user. In certain embodiments, a combination of most recent content items 212, most successful content items 214, and/or randomly sampled content items 216 are selected.

The selected content items from existing user-generated content 210 are provided to language processing machine learning model 230 along with an attribute extraction prompt 220. Attribute extraction prompt 220 generally includes natural language instructions that instruct language processing machine learning model 230 to extract particular brand voice attributes from the input content items. In some embodiments, attribute extraction prompt 220 indicates a particular list of brand voice attributes that are to be extracted, such as defining the form of each brand voice attribute (e.g., binary, classification, narrative, and/or the like) and/or a structured format in which the brand voice attributes are to be output (e.g., a JSON object having a particular structure). In one example, attribute extraction prompt 220 instructs language processing machine learning model 230 to determine whether each of a plurality of brand voice attributes are present and/or to extract particular brand voice attributes from the input content items. Attribute extraction prompt 220 may, for instance, instruct language processing machine learning model 230 to extract a narrative brand voice description (e.g., indicating an expected output of 1-3 sentences). Attribute extraction prompt 220 may, for instance, instruct language processing machine learning model 230 to extract one or more brand voice trait classifications, such as: qualities and/or characteristics that are unique to a brand's identity (e.g., indicating an expected output of a comma-separated list of strings), a list of feelings that a brand evokes in its audience through writing (e.g., indicating an expected output of a comma-separated list of strings), a Boolean flag indicating whether the brand's voice is more matter of fact or more expressive (e.g., indicating an expected output of a Boolean value indicating true or false), and/or the like. Attribute extraction prompt 220 may, for instance, instruct language processing machine learning model 230 to extract one or more writing style attributes, including one or more of: a typical structure of the brand's written content (e.g., indicating an expected output of a string, such as indicating whether the typical structure includes, simple, compound, or complex sentences), a typical length of sentences for the brand's written content (e.g., indicating an expected output of an integer), a list of specific punctuation rules and/or conventions used by the brand, including unique or unconventional uses of punctuation marks (e.g., indicating an expected output of a comma separated list of strings, such as "Oxford commas" or "ellipses"), a list of commonly used figures of speech in the brand's written content (e.g., indicating an expected output of a comma separated list of strings, such as "metaphors", "similes", "irony", or "personification"), a Boolean flag indicating whether the brand typically uses lists or bullet points in their written content (e.g., indicating an expected output of a Boolean value of true or false), a preferred point of view of the brand (e.g., indicating an expected output of a string such as "first person", "second person", or "third person"), a list of keywords frequently used in the brand's content that are unique to the brand (e.g., indicating an expected output of a comma separated list of strings, such as excluding seasonal language and/or named holidays), a Boolean flag indicating whether the brand's written content is more inquisitive or declarative in style (e.g., indicating an expected output of a Boolean value of true or false), and/or the like. Attribute extraction prompt 220 may, for instance, include examples of what outputs should look like and/or indicating the types of information that outputs should not include (e.g., personally identifiable information, named holidays, seasonal language, and/or the like).

Language processing machine learning model 230 may, for example, be an LLM such as a generative pre-trained transformer (GPT) model, and may have been trained through a machine learning process based on a large corpus of natural language text in order to process natural language inputs and produce outputs that are requested in the natural language inputs. In response to the selected content items and attribute extraction prompt 220, language processing machine learning model 230 may output brand voice attributes 240. For example, brand voice attributes 240 may include one or more of the brand voice attributes that attribute extraction prompt 220 instructs language processing machine learning model 230 to extract from the content items.

While not shown, brand voice attribute determiner 114 may additionally or alternatively extract one or more brand voice attributes from other sources, such as public websites and/or databases that include information about a brand associated with a user, such as from one or more external data sources 130 of FIG. 2, described below. Furthermore, brand voice attribute determiner 114 may additionally or alternatively determine one or more brand voice attributes based on similarities between attributes of the user and one or more other users. For example, a similarity measure between the user and one or more other users may be determined based on comparison of user attributes, and if the similarity measure between the user and a different user exceeds a threshold (or is below a threshold, depending on the similarity measure) then one or more known brand voice attributes of the different user may be used as brand voice attributes of the user. Additionally, brand voice attribute determiner 114 may determine one or more brand voice attributes based on one or more recipients or recipient types of a content item that is to be generated. For example, brand voice attribute determiner 114 may retrieve one or more known attributes of a recipient or recipient type indicated by the user for the content item, and may include the retrieved one or more recipient attributes in attribute extraction prompt 220, such as instructing language processing machine learning model 230 to consider the recipient attributes when extracting brand voice attributes 240. In other embodiments, recipient attributes are considered separately from the determination of brand voice attributes, such as being used to define a tone or other aspect of the generated content item (e.g., via instructions to the generative model used to generate the content).

Example Computing Components Related to Automated Content Generation in a Brand Voice Through Machine Learning FIG. 2 is a diagram 200 illustrating example computing components related to automated content generation in a brand voice through machine learning, according to certain embodiments. Diagram 200 includes brand voice attribute determiner 114 of FIG. 1.

In diagram 200, a server 110 is connected to a client 120 via a network 150, which may represent any connection over which data may be transmitted (e.g., the Internet). Server 110 is further connected to one or more external data sources 130 (e.g., websites, databases, and/or the like), such as via network 150 and/or a different network.

Server 110 generally represents a computing device, such as a server computer, that runs a brand voice content generation engine 112. Brand voice content generation engine 112 generally represents a software component that performs functionality described herein for determining brand voice attributes of a user and automatically generating content based on the determined brand voice attributes.

Client 120 generally represents a computing device that is separate from server 110, such as a user device (e.g., desktop or laptop computer, smartphone, tablet, and/or the like). A user interface 122 on client 120 enables a user to request automated content generation, specify and/or modify brand voice attributes, review and/or provide feedback with respect to content that has been automatically generated based on brand voice attributes, approve generated content for transmission to one or more recipients, and/or the like.

In one example, a user requests generation of content via user interface 122, prompting a request 124 to be sent from client 120 to server 110, where it is handled by brand voice content generation engine 112. The request may, for example, be a request to generate an email or other type of communication, such as for transmission to one or more recipients for purposes such as advertising, promotion, information, support, entertainment, and/or the like. In some embodiments, user interface 122 includes a user interface control that allows the user to enable or disable a "brand voice" feature. When the brand voice feature is enabled (which may be enabled by default in some embodiments), content is automatically generated using brand voice attributes that are determined for the user.

A brand voice attribute determiner 114 in brand voice content generation engine 112 may determine brand voice attributes of the user for use in handling request 124. In some embodiments, the user specifies one or more brand voice attributes via a user interface 122. For example, user interface 122 may prompt the user to provide and/or select specific brand voice attributes, such as providing a text entry field for the user to provide a narrative brand voice description and/or providing user interface controls that enable the user to select and/or deselect particular brand voice trait classifications and/or writing style attributes, and these brand voice attributes may be provided to brand voice attribute determiner 114. In some embodiments, brand voice attribute determiner 114 may automatically determine one or more brand voice attributes. For example, brand voice attribute determiner 114 may infer one or more brand voice attributes based on known attributes associated with the user (e.g., business type, industry, business size, age of business, geographic location of business, and/or other business attributes), such as using stored associations between such known attributes and particular brand voice attributes, comparing the user's known attributes to known attributes of other users/businesses in order to determine similar user(s)/business(es) (e.g., and using brand voice attributes of the similar user(s)/business(es) as brand voice attributes of the user), and/or using machine learning techniques (using a machine learning model trained through supervised learning techniques to output brand voice attributes in response to input user attributes).

In certain embodiments, as described above with respect to FIG. 1, brand voice attribute determiner 114 automatically extracts brand voice attributes for a user from existing user-generated content items for the user. For example, brand voice attribute determiner 114 may retrieve existing user-generated content items (e.g., from a data store), such as past emails or other communications that the user generated for transmission to one or more recipients, and may select a subset of such content items for use in extracting brand voice attributes. In one example, the n most recent user-generated content items for the user are selected. In another example, the n most successful user-generated content items for the user are selected (e.g., where success of a content item is determined based on the level of engagement the content item received from recipients, such as based on numbers of clicks, amounts of positive feedback, and/or the like). In another example, n user-generated content items for the user are randomly selected. For example, n may be a configurable value or may be set in advance (e.g., based on experimental results indicating that using a certain number of exiting content items produces the best results and/or the best balance of result quality and computing resource utilization). In one particular example, n=3.

The selected existing user-generated content items may then be processed in order to automatically extract brand voice attributes. For example, brand voice attribute determiner 114 may generate a prompt to provide to a language processing machine learning model (e.g., language processing machine learning model 230 of FIG. 1), the prompt instructing the model to extract particular brand voice attributes from the provided user-generated content items. In some embodiments, the prompt specifies a particular structured format in which the model is to output the brand voice attributes that it extracts. In one example, the prompt instructs the model to output a particular set of brand voice attributes in a structured object format such as a JavaScript Object Notation (JSON) object format. Brand voice attribute determiner 114 may provide the prompt to the language processing machine learning model along with the selected existing user-generated content items (e.g., which may be included as few-shot learning examples in the prompt), and the language processing machine learning model may output the extracted brand voice attributes (e.g., according to a structured format specified in the prompt).

Once brand voice attribute determiner 114 determines the brand voice attributes (e.g., based on automated determination techniques described with respect to FIG. 1, based on user input via user interface 122, and/or the like), brand voice content generator 116 of brand voice content generation engine 112 may use the determined brand voice attributes to automatically generate the requested content. For example, brand voice content generator 116 may perform functionality described herein related to automated content generation based on brand voice attributes. In some embodiments, as described in more detail below with respect to FIG. 3, brand voice content generator 116 may generate a prompt to provide to a generative language processing machine learning model such as an LLM, the prompt instructing the model to generate particular content according to the brand voice attributes. For example, the prompt may include the brand voice attributes as few-shot learning examples, and may include natural language instructions (e.g., based on request 124) to generate a particular type of content (e.g., an email or other communication) for a specific purpose (e.g., advertising a business, promoting a particular product, offering a discount, sharing particular information, inviting attendance at an event, and/or the like) in a brand voice that is defined by the included brand voice attributes. The prompt may be provided to the generative language processing machine learning model, which may output the generated content in the brand voice according to the prompt. For example, content in brand voice 126 may be generated, and may be provided to client 120 for display via a user interface 122.

The user may review content in brand voice 126 via user interface 122, and may determine whether to approve the content for its intended purpose, such as transmission to one or more recipients. The user may provide feedback with respect to content in brand voice 127, such as accepting, rejecting, and/or modifying content in brand voice 126. In some embodiments, the brand voice attributes used to generate content in brand voice 126 may also be provided to client 120 for display via user interface 122. For example, as described in more detail below with respect to FIG. 4, the user may review the brand voice attributes via a user interface 122 and may provide feedback with respect to the brand voice attributes, such as adding, removing, and/or modifying one or more brand voice attributes. Modifications made to brand voice attributes via user interface 122 may be sent to server 110 and used to generate new content. For example, brand voice content generator 116 may generate an updated prompt based on such modifications (e.g., including the newly updated brand voice attributes) and provide the updated prompt to the generative language processing machine learning model, which may output different content in response (e.g., reflecting the updated brand voice). The different content may be provided back to client 120 for display, review, and/or modification via user interface 122.

Furthermore, a user may edit the content that is automatically generated based on the user's brand voice attributes, and such edits may be taken as feedback with respect to the brand voice attributes. For example, an edit distance between the modified content (e.g., as edited by the user) and the content as automatically generated (e.g., prior to any user edits) may be used to determine an accuracy of the brand voice attributes, and the accuracy may be used to determine whether to modify the brand voice attributes (e.g., automatically or manually). An edit distance is a measure of dissimilarity between two strings, and is determined by counting the minimum number of operations required to transform one of the two strings into the other. In certain embodiments, the edit distance between the modified content and the content as automatically generated is compared to a threshold and, if the edit distance exceeds a threshold (e.g., indicating more than a threshold amount of dissimilarity), then one or more actions may be taken to update the brand voice attributes, such as prompting the user to review and/or modify the brand voice attributes via the user interface, generating an updated prompt to the language processing machine learning model to automatically extract brand voice attributes (e.g., including the modified content as a few-shot learning example and/or otherwise including different few-shot learning examples than those used previously), and/or the like. Newly extracted and/or modified brand voice attributes may then be used to generate different content. For example, brand voice content generator 116 may generate an updated prompt based on such newly extracted and/or modified brand voice attributes and provide the updated prompt to the generative language processing machine learning model, which may output different content in response (e.g., reflecting the updated brand voice). The different content may be provided back to client 120 for display, review, and/or modification via user interface 122.

In some embodiments, brand voice attributes determined by brand voice attribute determiner 114 and/or otherwise specified and/or modified by the user are stored (e.g., on server 110) for use in subsequent content generation operations. For example, when a new content generation request is received from a user, brand voice content generation engine 112 may first determine whether brand voice attributes are already stored for the user, and may use stored brand voice attributes for automatically generating content if they are available. If no brand voice attributes are stored for the user, brand voice content generation engine 112 may (e.g., via brand voice attribute determiner 114) determine the brand voice attributes for the user using techniques described herein. For example, brand voice attributes for a user, once determined, may be stored in a feature store (e.g., for storing machine learning model input features) or other suitable data storage entity and retrieved from the feature store or other suitable data storage entity for use in generating subsequent content for the user.

Additionally, recipient attributes may also be used by brand voice content generation engine 112 when automatically generating content that is to be transmitted to one or more recipients or recipient types. For example, request 124 may indicate one or more recipients or recipient types to which the generated content is intended to be distributed, and brand voice content generation engine 112 may retrieve known attributes of those recipients or recipient types (e.g., geographic location, occupation, interests, skills, application history, purchase history, and/or the like). These recipient attributes may be used by brand voice content generator 116 when generating the prompt, such as including in the prompt an instruction to generate the content in a way that corresponds to the recipient attributes. Thus, in such embodiments, content in brand voice 126 may be further tailored for the intended audience of the content. It is noted that the recipient attributes may be included as brand voice attributes and/or may be used as a separate part of the content generation process, such as being included as different attributes in the prompt, such as relating to the tone of the content and/or other aspects of the generation of the content.

Example Automated Generation of Content in a Brand Voice

Figure 3:
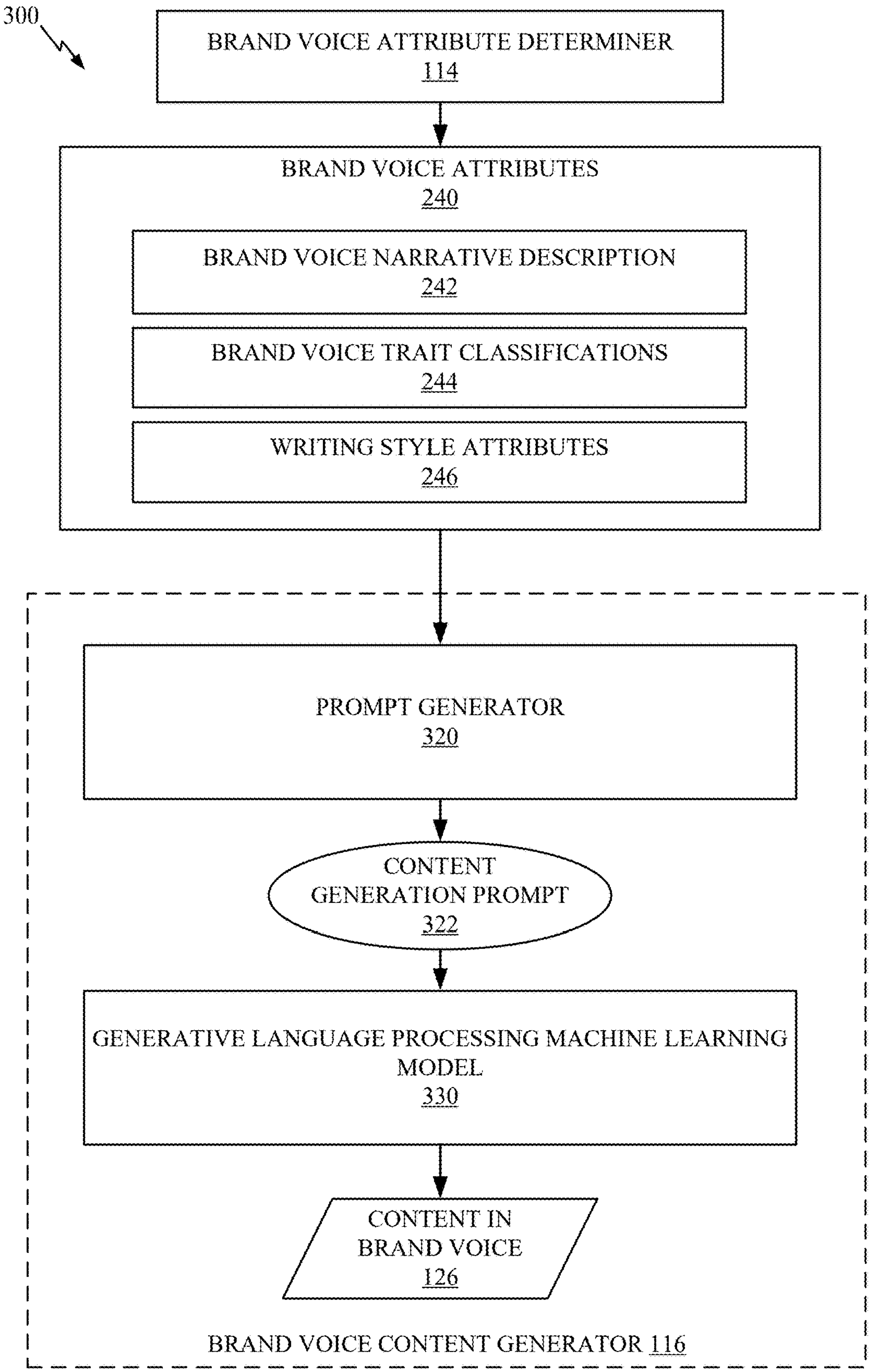
FIG. 3 is a diagram depicting an example of automated content generation in a brand voice through machine learning, according to certain embodiments.

FIG. 3 is a diagram 300 depicting an example of automated content generation in a brand voice through machine learning, according to certain embodiments. Diagram 300 includes brand voice attribute determiner 114 and brand voice attributes 240 of FIG. 1 and brand voice content generator 116 and content in brand voice 126 of FIG. 2.

In diagram 300, brand voice attribute determiner 114 provides brand voice attributes 340 to a prompt generator 320 of brand voice content generator 116. For example, brand voice attribute determiner 114 may have determined brand voice attributes based on automated extraction of brand voice attributes from existing user-generated content (e.g., as described above with respect to FIG. 1), based on input provided by the user (e.g., via user interface 122 of FIG. 2), based on known brand voice attributes of one or more other users similar to the user (e.g., where similarity is determined based on shared user attributes), based on one or more other source(s) such as external data source(s) 130 of FIG. 2, and/or the like.

Brand voice attributes 240 include a brand voice narrative description 242, one or more brand voice trait classifications 244, and/or one or more writing style attributes 246. In some embodiments, brand voice attributes 240 are in the form of a structured object, such as a JSON object.

Brand voice narrative description 242 may include, for example, one to three sentences describing the brand voice in natural language. Brand voice trait classification 244 may include one or more of: qualities and/or characteristics that are unique to a brand's identity (e.g., a comma-separated list of strings), a list of feelings that a brand evokes in its audience through writing (e.g., a comma-separated list of strings), a Boolean flag indicating whether the brand's voice is more matter of fact or more expressive, and/or the like. Writing style attributes 246 may include one or more of: a typical structure of the brand's written content (e.g., a string, such as indicating whether the typical structure includes, simple, compound, or complex sentences), a typical length of sentences for the brand's written content (e.g., an integer indicating a number of characters or a number of words), a list of specific punctuation rules and/or conventions used by the brand such as including unique or unconventional uses of punctuation marks (e.g., a comma separated list of strings, such as "Oxford commas" or "ellipses"), a list of commonly used figures of speech in the brand's written content (e.g., a comma separated list of strings, such as "metaphors", "similes", "irony", or "personification"), a Boolean flag indicating whether the brand typically uses lists or bullet points in their written content, a preferred point of view of the brand (e.g., a string such as "first person", "second person", or "third person"), a list of keywords frequently used in the brand's content that are unique to the brand (e.g., a comma separated list of strings), a Boolean flag indicating whether the brand's written content is more inquisitive or declarative in style, and/or the like. For example, brand voice attributes 240 may have been extracted by language processing machine learning model 230 of FIG. 1, such as based on brand voice attributes specified in attribute extraction prompt 220 of FIG. 1.

Prompt generator 320 may generate a content generation prompt 322 based on brand voice attributes 240. For example, prompt generator 320 may add brand voice attributes 240 as few-shot learning examples to a prompt that instructs generative language processing machine learning model 330 to generate content (e.g., a particular type of content requested by the user) according to the brand voice attributes. In some embodiments, prompt generator 320 generates the prompt based on configured prompt language for use in generating different types of content. Such configured prompt language may be stored in association with prompt generator 320, and prompt generator 320 may retrieve such configured prompt language based on information in the request (e.g., request 124 of FIG. 2). Prompt generator 320 may generate content generation prompt 322 based on such retrieved language and based on brand voice attributes 240.

Content generation prompt 322 may be provided to generative language processing machine learning model 330, which may generate content in brand voice 126 in response to content generation prompt 322. Generative language processing machine learning model 330 may, for example, be a large language model (LLM) such as a GPT model. In some embodiments, generative language processing machine learning model 330 is the same model as language processing machine learning model 230 of FIG. 1, while in other embodiments generative language processing machine learning model 330 and language processing machine learning model 230 of FIG. 1 are different models. Generative language processing machine learning model 330 may have been trained through a machine learning process based on a large corpus of natural language text in order to process natural language inputs and generate content that is requested in the natural language inputs.

Content in brand voice 126 generally represents a content item such as an email, advertisement, article, or other type of content (e.g., corresponding to the type of content requested by the user), such as including text that has been generated based on brand voice attributes 240 to correspond to a brand voice of the user. Content in brand voice 126 may, for example, be generated in such a manner that it corresponds to the narrative, trait classifications, and writing style attributes described above.

Example Brand Voice Customization

Figure 4:
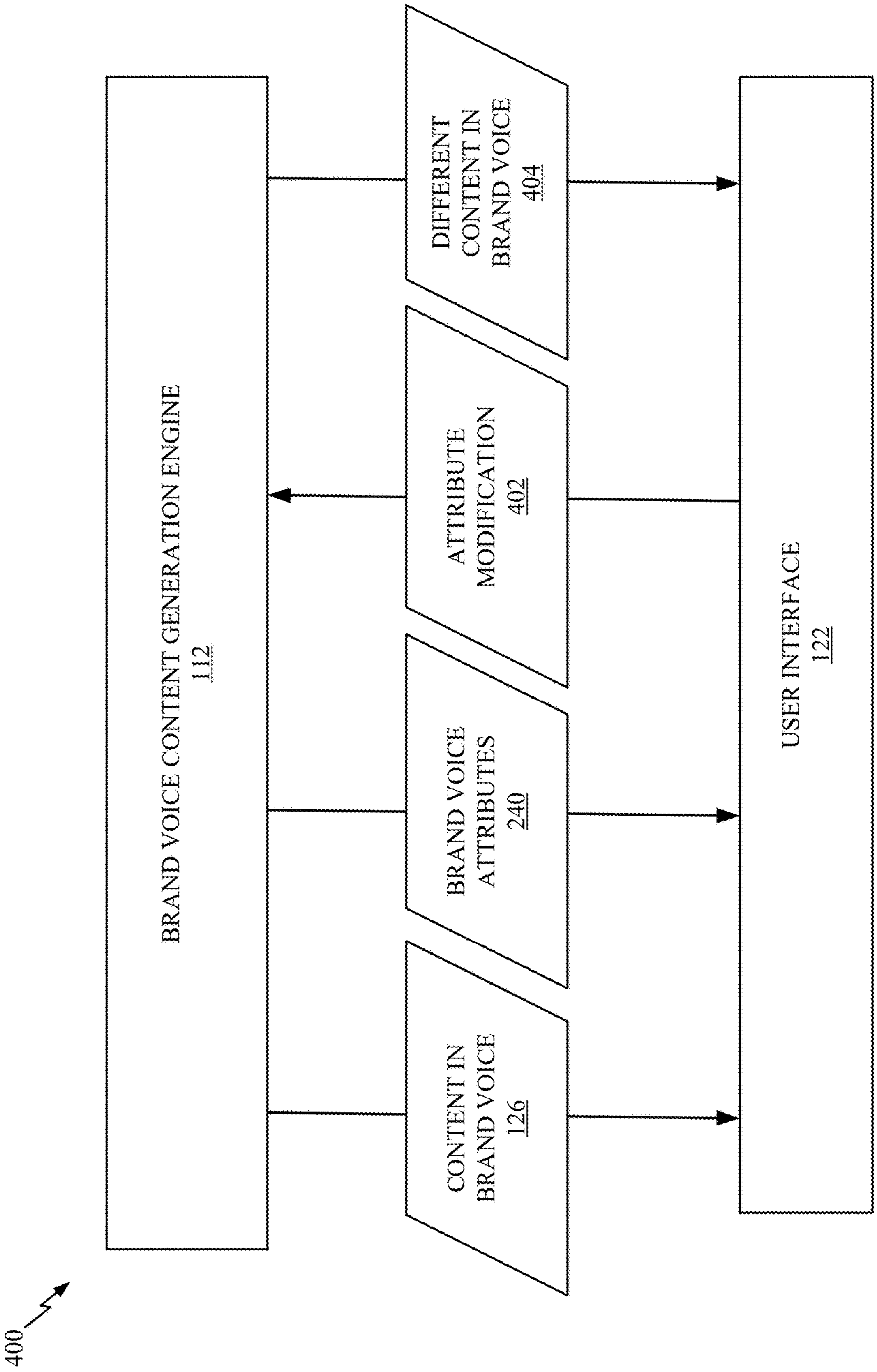
FIG. 4 is a diagram depicting an example of brand voice customization for automated content generation in a brand voice through machine learning, according to certain embodiments.

FIG. 4 is a diagram 400 depicting an example of brand voice customization for automated content generation in a brand voice through machine learning, according to certain embodiments. Diagram 400 includes brand voice attributes 240 of FIG. 1 and brand voice generation engine 112, user interface 122, and content in brand voice 126 of FIG. 2.

In diagram 400, brand voice generation engine 112 provides content in brand voice 126 and brand voice attributes 240 to user interface 122 For example, content in brand voice 126 may have been generated as described above with respect to FIG. 3 based on brand voice attributes 240, and brand voice attributes 240 may have been automatically determined as described above with respect to FIG. 1. A user may review content in brand voice 126 and brand voice attributes 240 via user interface 122, such as determining whether the content accurately reflects a brand voice of the user and reviewing the brand voice attributes used to generate the content to determine whether the attributes are accurate. For example, if the user is not satisfied with the generated content, the user may review the brand voice attributes to determine if there are any inaccuracies that can be corrected.

The user may modify one or more of brand voice attributes 240 via user interface 122, such as by interacting with one or more user interface controls, and one or more attribute modifications 402 may be provided from user interface 122 to brand voice content generation engine 112 based on the user's modification(s). For example, an attribute modification 402 may include an addition of a brand voice attribute, a removal of a brand voice attribute, and/or a modification to a brand voice attribute. Brand voice content generation engine 112 may perform one or more actions based on attribute modification 402, such as generating different content in brand voice 404 based on attribute modification 402. For example, the brand voice attributes for the user may be updated based on attribute modification 402, and brand voice content generation engine 112 may provide the updated brand voice attributes as few-shot learning examples to the generative language processing machine learning model along with a prompt to generate the content requested by the user, and the model may output different content in brand voice 404. Different content in brand voice 404 may be provided to user interface 122 for display to the user.

In some embodiments, when the user provides feedback approving content in brand voice 126 and/or different content in brand voice 404, the approved content may be transmitted to one or more recipients, such as the recipients indicated by the user.

Figure 5:
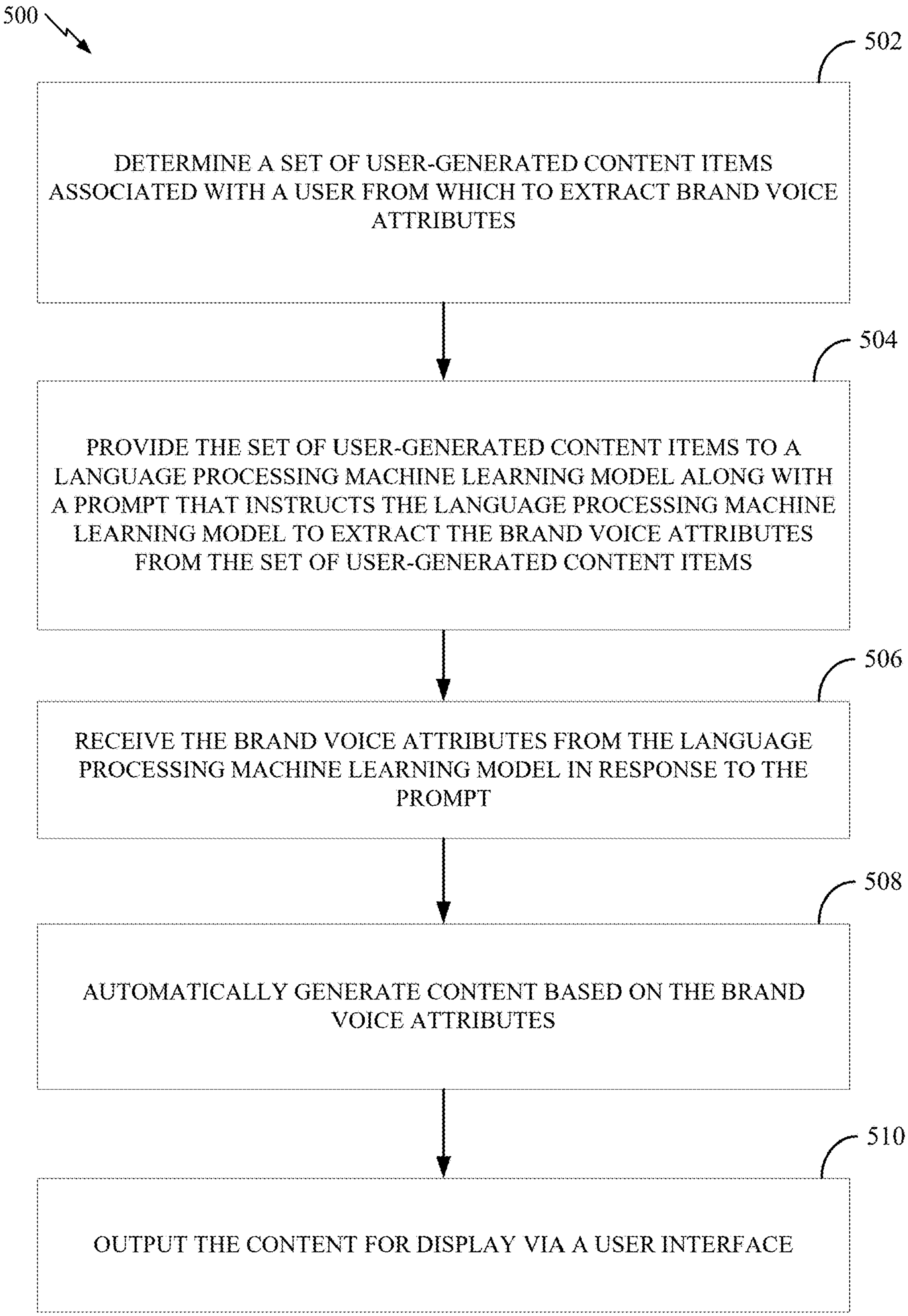
FIG. 5 depicts example operations related to automated extraction of brand voice attributes for automated content generation in a brand voice through machine learning, according to certain embodiments.

Example Operations for Automated Extraction of Brand Voice Attributes for Automated Generation of Content in a Brand Voice Through Machine Learning FIG. 5 depicts example operations 500 for automated extraction of brand voice attributes for automated content generation in a brand voice through machine learning, according to certain embodiments. For example, operations 500 may be performed by one or more components described above with respect to FIGS. 1-4, system 600A or 600B of FIG. 6A or 6B (described below), and/or one or more other components and/or devices.

Operations 500 begin at step 502, with determining a set of user-generated content items associated with a user from which to extract brand voice attributes.

In some embodiments, the determining of the set of user-generated content items associated with the user from which to extract the brand voice attributes comprises: determining most recently generated content items; determining content items with highest levels of recipient engagement; or determining randomly sampled content items.

Operations 500 continue at step 504, with providing the set of user-generated content items to a language processing machine learning model along with a prompt that instructs the language processing machine learning model to extract the brand voice attributes from the set of user-generated content items.

In some embodiments, the prompt instructs the language processing machine learning model to output the brand voice attributes according to a particular structured format including a particular list of attribute types.

Operations 500 continue at step 506, with receiving the brand voice attributes from the language processing machine learning model in response to the prompt.

In some embodiments, the language processing machine learning model extracts, as the brand voice attributes according to the prompt, a narrative brand voice description, one or more brand voice trait classifications, and one or more writing style attributes.

Operations 500 continue at step 508, with automatically generating content based on the brand voice attributes.

In some embodiments, the automatically generating the content based on the brand voice attributes comprises providing a corresponding prompt to a generative language processing machine learning model that instructs the generative language processing machine learning model to generate the content based on the brand voice attributes.

Operations 500 continue at step 510, with outputting the content for display via a user interface.

Some embodiments further comprise receiving a modification to one of the brand voice attributes via the user interface after the receiving of the brand voice attributes from the language processing machine learning model. Certain embodiments further comprise automatically generating different content based on the modification.

Example Computing Systems

Figure 6A:
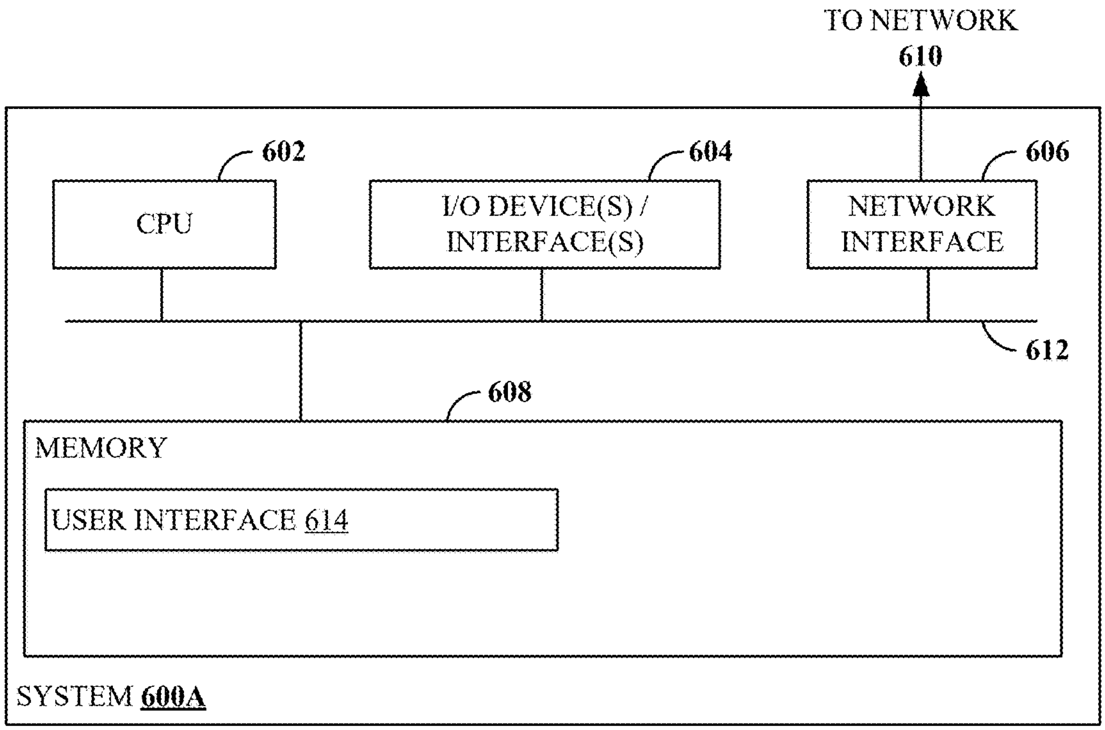
FIGS. 6A and 6B depict example processing systems for automated content generation in a brand voice through machine learning, according to certain embodiments.

FIG. 6A illustrates an example system 600A with which embodiments of the present disclosure may be implemented. For example, system 600A may be configured to perform one or more of operations 500 of FIG. 5. In one example system 600A corresponds to server 110 of FIG. 2.

System 600A includes a central processing unit (CPU) 602, one or more I/O device interfaces 604 that may allow for the connection of various I/O devices 604 (e.g., keyboards, displays, mouse devices, pen input, etc.) to the system 600A, network interface 606, a memory 608, and an interconnect 612. It is contemplated that one or more components of system 600A may be located remotely and accessed via a network 610. It is further contemplated that one or more components of system 600A may comprise physical components or virtualized components.

CPU 602 may retrieve and execute programming instructions stored in the memory 608. Similarly, the CPU 602 may retrieve and store application data residing in the memory

608. The interconnect 612 transmits programming instructions and application data, among the CPU 602, I/O device interface 604, network interface 606, and memory 608. CPU 602 is included to be representative of a single CPU, multiple CPUs, a single CPU having multiple processing cores, and other arrangements.

Additionally, the memory 608 is included to be representative of a random access memory or the like. In some embodiments, memory 608 may comprise a disk drive, solid state drive, or a collection of storage devices distributed across multiple storage systems. Although shown as a single unit, the memory 608 may be a combination of fixed and/or removable storage devices, such as fixed disc drives, removable memory cards or optical storage, network attached storage (NAS), or a storage area-network (SAN).

As shown, memory 608 includes a user interface 614, which may be representative of user interface 122 of FIG. 2. For example, a user may interact with user interface 614 to request automated content generation, review and/or provide feedback with respect to automatically generated content, review, configure, and/or provide feedback with respect to brand voice attributes, and/or the like.

Figure 6B:
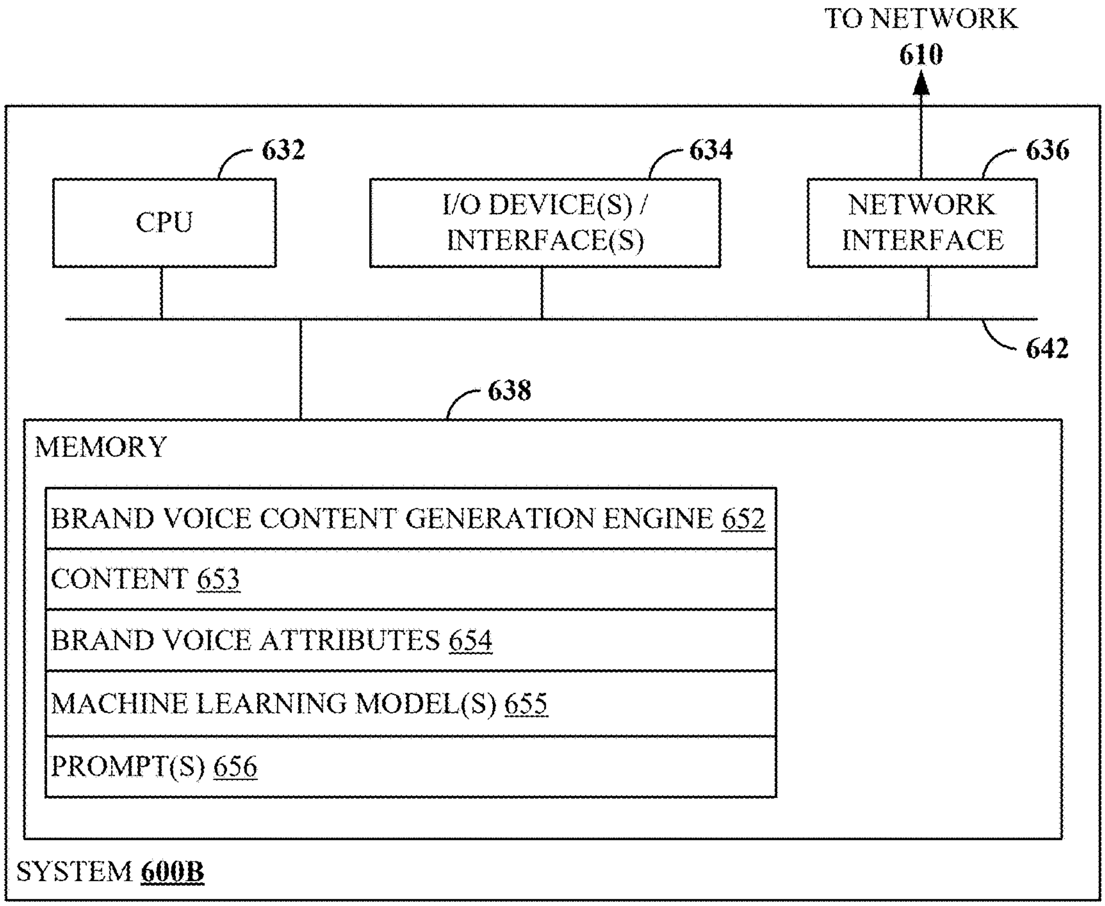

FIG. 6B illustrates another example system 600B with which embodiments of the present disclosure may be implemented. For example, system 600B may correspond to client 120 of FIG. 2, and may be configured to perform one or more of operations 500 of FIG. 5.

System 600B includes a CPU 632, one or more I/O device interfaces 634 that may allow for the connection of various I/O devices 634 (e.g., keyboards, displays, mouse devices, pen input, etc.) to the system 600B, network interface 636, a memory 638, and an interconnect 642. It is contemplated that one or more components of system 600B may be located remotely and accessed via a network 610. It is further contemplated that one or more components of system 600B may comprise physical components or virtualized components.

CPU 632 may retrieve and execute programming instructions stored in the memory 638. Similarly, the CPU 632 may retrieve and store application data residing in the memory 638. The interconnect 642 transmits programming instructions and application data, among the CPU 632, I/O device interface 634, network interface 636, and memory 638. CPU 632 is included to be representative of a single CPU, multiple CPUs, a single CPU having multiple processing cores, and other arrangements.

Additionally, the memory 638 is included to be representative of a random access memory or the like. In some embodiments, memory 638 may comprise a disk drive, solid state drive, or a collection of storage devices distributed across multiple storage systems. Although shown as a single unit, the memory 638 may be a combination of fixed and/or removable storage devices, such as fixed disc drives, removable memory cards or optical storage, network attached storage (NAS), or a storage area-network (SAN).

As shown, memory 638 includes a brand voice content generation engine 652, which may be representative of brand voice content generation engine 112 of FIG. 2. Memory 638 further includes content 653, which may include content in brand voice 126 of FIG. 2, existing user-generated content 210 of FIG. 1, and different content in brand voice 404 of FIG. 4. Memory 638 further includes brand voice attributes 654, which may include brand voice attributes 240 of FIGS. 1, 3, and 4. Memory 638 further includes machine learning model(s) 655, which may include language processing machine learning model 230 of FIG. 1 and generative language processing machine learning model 330 of FIG. 3. Memory 638 further includes prompt(s) 656, which may include attribute extraction prompt 220 of FIG. 1 and content generation prompt 322 of FIG. 3.

It is noted that systems 600A and 600B are included as examples, and certain functionality described with respect to systems 600A and/or 600B and/or otherwise described herein may be implemented via more or fewer devices and/or components.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for automated content generation in a brand voice through machine learning, comprising:

determining a set of user-generated content items associated with a user from which to extract brand voice attributes;

providing the set of user-generated content items to a language processing machine learning model along with a prompt that instructs the language processing machine learning model to extract the brand voice attributes from the set of user-generated content items;

receiving the brand voice attributes from the language processing machine learning model in response to the prompt;

automatically generating content based on the brand voice attributes; and outputting the content for display via a user interface.

2. The method of claim 1, wherein the determining of the set of user-generated content items associated with the user from which to extract the brand voice attributes comprises:

determining most recently generated content items;

determining content items with highest levels of recipient engagement; or determining randomly sampled content items.

3. The method of claim 1, wherein the language processing machine learning model extracts, as the brand voice attributes according to the prompt, a narrative brand voice description, one or more brand voice trait classifications, and one or more writing style attributes.

4. The method of claim 1, further comprising receiving a modification to one of the brand voice attributes via the user interface after the receiving of the brand voice attributes from the language processing machine learning model.

5. The method of claim 4, further comprising automatically generating different content based on the modification.

6. The method of claim 1, wherein the prompt instructs the language processing machine learning model to output the brand voice attributes according to a particular structured format including a particular list of attribute types.

7. The method of claim 1, wherein the automatically generating the content based on the brand voice attributes comprises providing a corresponding prompt to a generative language processing machine learning model that instructs the generative language processing machine learning model to generate the content based on the brand voice attributes.

8. A system for automated content generation in a brand voice through machine learning, comprising:

one or more processors; and a memory comprising instructions that, when executed by the one or more processors, cause the system to:

determine a set of user-generated content items associated with a user from which to extract brand voice attributes;

provide the set of user-generated content items to a language processing machine learning model along with a prompt that instructs the language processing machine learning model to extract the brand voice attributes from the set of user-generated content items;

receive the brand voice attributes from the language processing machine learning model in response to the prompt;

automatically generate content based on the brand voice attributes; and output the content for display via a user interface.

9. The system of claim 8, wherein the determining of the set of user-generated content items associated with the user from which to extract the brand voice attributes comprises:

determining most recently generated content items;

determining content items with highest levels of recipient engagement; or determining randomly sampled content items.

10. The system of claim 8, wherein the language processing machine learning model extracts, as the brand voice attributes according to the prompt, a narrative brand voice description, one or more brand voice trait classifications, and one or more writing style attributes.

11. The system of claim 8, wherein the instructions, when executed by the one or more processors, further cause the system to receive a modification to one of the brand voice attributes via the user interface after the receiving of the brand voice attributes from the language processing machine learning model.

12. The system of claim 11, wherein the instructions, when executed by the one or more processors, further cause the system to automatically generate different content based on the modification.

13. The system of claim 8, wherein the prompt instructs the language processing machine learning model to output the brand voice attributes according to a particular structured format including a particular list of attribute types.

14. The system of claim 8, wherein the automatically generating the content based on the brand voice attributes comprises providing a corresponding prompt to a generative language processing machine learning model that instructs the generative language processing machine learning model to generate the content based on the brand voice attributes.

15. A non-transitory computer readable medium comprising instructions that, when executed by one or more processors of a computing system, cause the computing system to:

determine a set of user-generated content items associated with a user from which to extract brand voice attributes;

provide the set of user-generated content items to a language processing machine learning model along with a prompt that instructs the language processing machine learning model to extract the brand voice attributes from the set of user-generated content items;

receive the brand voice attributes from the language processing machine learning model in response to the prompt;

automatically generate content based on the brand voice attributes; and output the content for display via a user interface.

16. The non-transitory computer readable medium of claim 15, wherein the determining of the set of user-generated content items associated with the user from which to extract the brand voice attributes comprises:

determining most recently generated content items;

determining content items with highest levels of recipient engagement; or determining randomly sampled content items.

17. The non-transitory computer readable medium of claim 15, wherein the language processing machine learning model extracts, as the brand voice attributes according to the prompt, a narrative brand voice description, one or more brand voice trait classifications, and one or more writing style attributes.

18. The non-transitory computer readable medium of claim 15, wherein the instructions, when executed by the one or more processors, further cause the computing system to receive a modification to one of the brand voice attributes via the user interface after the receiving of the brand voice attributes from the language processing machine learning model.

19. The non-transitory computer readable medium of claim 18, wherein the instructions, when executed by the one or more processors, further cause the computing system to automatically generate different content based on the modification.

20. The non-transitory computer readable medium of claim 15, wherein the prompt instructs the language processing machine learning model to output the brand voice attributes according to a particular structured format including a particular list of attribute types.

* * * * *